United States Patent [19]

Misaki et al.

[11] 3,857,975

[45] Dec. 31, 1974

[54] METHOD FOR PREPARING JELLIFIED FOODS

[75] Inventors: Masaru Misaki; Yukizo Tsujimoto; Tatuo Nakagawa, all of Osaka; Junko Sukenari, Hyogo; Shintaro Moritaka, Kobe, all of Japan

[73] Assignee: Takeda Chemical Industries, Ltd., Osaka, Japan

[22] Filed: July 3, 1973

[21] Appl. No.: 376,174

[30] Foreign Application Priority Data
July 5, 1972 Japan............................ 47-67720

[52] U.S. Cl................................. 426/167, 426/350
[51] Int. Cl............................................ A23g 1/04
[58] Field of Search............ 426/167, 350; 195/31 P

[56] References Cited
UNITED STATES PATENTS
3,301,848  1/1967  Halleck........................... 195/31 P

OTHER PUBLICATIONS

Harada et al., Agricultural Biological Chemistry, Vol. 30, pages 196–198.

Primary Examiner—Alvin E. Tanenholtz
Assistant Examiner—J. M. Hunter
Attorney, Agent, or Firm—Wenderoth, Lind & Ponack

[57] ABSTRACT

A novel type of jellified food is prepared by maintaining an aqueous dispersion of a thermally gelable polysaccharide consisting mainly of $\beta$-1, 3-glucose units at 55° to 80°C under stirring so as to obtain a fluid containing from 0.5 to 5 weight percent of said polysaccharide and then leaving this fluid to stand and cool. This food has an excellent texture and mouth-feel and retains its shape upon reheating.

5 Claims, No Drawings

METHOD FOR PREPARING JELLIFIED FOODS

This invention relates to an advantageous method for preparing jellified foods of superior quality.

The term 'jellified food' as used throughout the present specification and claims means foods which are in an elastic, transparent or opaque gel-like state and products available on freezing said foods and, accordingly, includes, among others, fruit jelly, milk jelly, pudding and other jelly-like foods assuming the consistencies and appearances of, for example, yoghurt, bean curd, etc. The recent upgrading and divesification of dietary habits have provided a significant impetus to the demand for jellified foods. Especially, various jelly-forming foods of the pre-mix type which can be easily transformed into a jelly at home are now commercially available in large quantities.

In such jellified foods, there have generally been incorporated some gelling agents such as gelatine, pectin, agar-agar and the like. As is well known, however, these gelling agents have various shortcomings which make them unsatisfactory in one aspect or other.

Taking gelatin, for example, it does not gel when hot, and does not form a gel of strong gel strength with acid materials such as fruit juices and, accordingly, is not suited for the applications where gelatin is to be used with acid foods. Accordingly, the choice of flavor for jellies containing gelatin is rather limited. Moreover, generally such jellies can hardly be prepared into neat finished shapes, for when they are to be taken out from the moulds, they tend to stick so tenaciously to the mould wall that warming is required for releasing the jellies cleanly. Furthermore, the melting point of gelatin is so low that it is impossible that the gelatin gels retain their shape after warming up the gelatin products. It is also impossible to store a gelatin jelly in frozen condition, for once it is frozen, the jelly cannot regain its intrinsic properties when it is thawed.

In the case of pectin, it is essential, in order that this material may form gels, to add a fruit juice and sugar and to ensure that the three ingredients of pectin, sugar and acid be present in suitable proportions.

Agar-agar does not gel when hot and is inherently not ready to gel under acid conditions, and agar jellies, once frozen, cannot regain their intrinsic jelly state upon thawing just as in the case of gelatin-jellies.

Meanwhile, there have been harvested from cultures of microorganisms several polysaccharides which consist mainly of $\beta$-1, 3-glucose units and which, quite unlike the above-mentioned gelling agents, are capable of gelling under heat (U.S. Pat. No. 3,754,925 and French Pat. No. 7,110,184). It has been found that the gels of these polysaccharides are very useful not only as foods but also as gelling agents in the manufacture of foods.

However, because they have the property to form gel on heating without stirring as opposed to the property of the conventional cold-coagulable gelling agents including gelatin, agar-agar, etc., it has been believed that these polysaccharides cannot find any application in a gelly type premix where a fluid prepared by heating is placed in moulds and chilled to set as it is or further heated again to gain a final jellified food.

Under such circumstances the present inventors conducted an intensive work on the above mentioned thermally gelable polysaccharides. The work led them to the surprising discovery (1) that an aqueous dispersion of the polysaccharide will not gel at all even if heated to a temperature of 55° to 80°C, the temperature at which the polysaccharide should normally gel, provided that the dispersion is heated while stirring, and (2) that the resultant fluid will gel, however, if it is left to stand and cool. It was further found that this gel has an excellent texture, giving a good mouth-feel. The present invention is the result of these findings and subsequent studies.

Thus, the main purpose of the present invention is to provide a novel method for preparing a jellified food.

Another purpose is to provide a jellified food possessing large merits and features which will be explained in the following disclosure.

The present invention relates to a method for preparing a jellified food characterized in that an aqueous dispersion containing a thermally gelable polysaccharide consisting mainly of $\beta$-1, 3-glucose units as a gelling agent is heated to a temperature of 55° to 80°C under stirring so as to give a fluid containing from 0.5 to 5 weight percent of said polysaccharide and, this fluid is then left to stand and cool.

The said thermally gelable polysaccharides can be produced by cultivating microorganisms of the genus Alcaligenes or of the genus Agrobacterium in accordance with the process described in U.S. Pat. No. 3,754,925, and are available as white or off-white powders.

The polysaccharides produced by Agrobacterium radiobacter IFO-13126, Alcaligenes faecalis var. mixogenes NTK-u strain IFO-13140 and Alkaligenes faecalis var. mixogenes K are specifically referred to in the Experiments and Examples as 'Polysaccharide A,' 'Polysaccharide B' and 'Curdlan,' respectively. In the following explanations, they are referred to simply as 'Polysaccharide.' 'Polysaccharide' has a unique characteristic in common; it swells upon addition of water and forms a gel when heated beyond 55°C without stirring. For example, if the 'Polysaccharide' is dispersed in water to a concentration of about 2 percent and then heated without agitation, it forms an elastic gel which is thermally irreversible. The gel is not redissolved, even if water is added thereto.

In accordance with this invention, there is first prepared an aqueous dispersion containing ingredients to be incorporated in the jellified food, including, as a gelling agent, from about 0.5 to about 5 weight percent, preferably 0.5 to 2 percent, of a thermally gelable 'Polysaccharide,' and the temperature of the dispersion is raised, while stirring, up to 55° to 80°C to give a fluid. As shown in Experiment 3, when the concentration of 'Polysaccharide' is below 0.5 percent, no gel is formed, whereas when it exceeds 5 percent the formation of a homogeneous gel is prevented.

As to the heating temperature, no jellified food is obtained below 55°C, whereas over 80°C, the final product will be a very gritty one (see Experiment 2).

In preparing this fluid, it is essential to raise the temperature under incessant agitation. Otherwise, when the temperature is raised up to 55° to 80°C without agitation, the fluid will gel before cooling, failing to give the objective jellified food. This agitation may be effected by a routine method, for example, by means of an agitator or a blender. It is not advisable, either, to prepare the fluid within this temperature range from the beginning. Rather, it is preferable to bring the temperature up from a level not exceeding 50°C into the above temperature range. In this connection, the temperature may be raised gradually or in a very short time.

More specifically, one may follow the following procedures. (1) A dispersion containing 0.5 to 5 weight percent of the polysaccharide is first prepared (the temperature of the dispersion is preferably within the range of about 0° to 50°C) and while the dispersion is stirred, its temperature is raised by heating to 55° to 80°C, or (2) hot water is poured into a dispersion containing a suitable amount of the polysaccharide so as to obtain a fluid at 55° to 80°C in which the concentration of 'Polysaccharide' is 0.5 to 5 weight percent. In this instance, the initial temperature of the dispersion is preferably within the range of about 0° to about 50°C.

When the temperature of the system immediately after the addition of water is 55°C or higher, the results are unsatisfactory, as 'Polysaccharide' fails to disperse evenly.

Since the gelation of 'Polysaccharide' at a low temperature as found by the present inventors occurs within an unusually wide pH range of about 2 to about 9, no special attention need be paid to the pH in preparation of the fluid and no trouble is encountered in virtually all ordinary kinds of food applications. Furthermore, in preparing the fluid, alcohol-containing water may be employed.

If required, such materials as natural sweeteners, e.g., sucrose, glucose, fructose, etc.; artificial sweeteners, e.g., saccharin acids such as citric acid, malic acid, ascorbic acid, fumaric acid, etc.; suitable spices; colors; condiments; shortenings; and such other natural matters and food additives as sorbit, dextrin, millet jelly, soy, chocolate, mayonnaise, coffee, cocoa, bean paste, soybean milk powder, sesame milk, fermented milk, defatted milk, vitamins, starch, sake, natural fruit juice, natural fruit, etc. may also be incorporated insofar as the addition of them will not be against the object of this invention. In this connection, what must be taken into consideration is that the incorporation of bean paste, natural fruit or other solid materials in excess amounts is undesirable and should be limited to an amount not more than about 10 percent based on the weight of the fluid.

If additives are used, the proportion of 'Polysaccharide' should be based on the total weight of the fluid including the weight of such solid additives.

In accordance with this invention, the fluid containing from 0.5 to 5 weight percent of 'Polysaccharide' as a gelling agent is first heated up to 55° to 80°C and then left to stand and cool in situ. This cooling process must be conducted under stationary conditions; that is to say, no agitation should be introduced. The fluid may be left standing for cooling or be chilled. It is necessary that the fluid be cooled to a temperature not higher than 40°C and, preferably, to about 10° to 5°C. By the above-described procedure, the fluid is caused to set, giving rise to the desired jellified food. Cooling the liquid to 0°C or a lower temperature results in a frozen product, which may be served as such or after thawing by heating or allowing it to stand at room temperature.

The following description pertains to an expedient method directed to the preparation of jellies at home.

A powdered fruit jelly premix containing 1 to 2 % by weight, relative to the final fluid, of 'Polysaccharide' as a gelling agent is dispensed into packets in amounts of 50 g. per packet. One packetful of this jelly premix and 50 ml of cold water (about 20°C) are put in a skillet and stirred. Then, 150 ml of boiling water is added and the mixture is gently stirred until it becomes a fluid of about 60° to 65°C. This fluid is distributed into three jelly cups and allowed to stand and cool in situ at 5° to 10°C. By such procedure the fluid is caused to gel, giving a tasty fruit jelly. In this connection, it is sufficient to allow the fluid to stand for about 15 minutes if the fluid is cooled in a freezer at about −10°C or for about 30 minutes when it is cooled in a refrigerator. When, in this procedure, the fluid is chilled until it has frozen, there is obtained a frozen jelly which has a good taste and pleasing mouth-feel like sherbets.

As the jelly obtained by cold gelling according to this invention does not deform, showing excellent shape, even when re-heated to about 70° to 120°C, unlike conventional agar or gelatin jelly, it can be subjected to routine pasteurization in processing thereof into products such as canned foods, bottled foods and packaged foods in synthetic resin containers (see Experiment 4).

As will be apparent from the foregoing description, the instant invention is not predicated at all upon the known heat-gelable property of 'Polysaccharide' but takes advantage of its cold-gelable property which has been discovered by the present inventors, and it has been shown that the present method utilizing the cold-gelable properties and the jellies prepared by the method have the following merits which cannot be provided by heat-gelling process of the same 'Polysaccharide' or by the conventional processes employing agar-agar or gelatin as the gelling agent.

1. The present process can be conducted at a comparatively low temperature (55° to 80°C), which serves to depress the evaporation of flavoring materials, spices and other ingredients in the dispersion. When, however, agar-agar or gelatin is employed, no homogeneous gel state can be brought about without once heating up to 90° to 100°C and 80° to 100°C, respectively.

2. With regard to cold-gelable property, jellified foods prepared by the present process begin to gel when they are cooled down to 35°C, whereas the gelling temperatures of agar-agar and gelatin are below 30°C and below 15°C, respectively. Therefore, the present process can provide the final jellified products in a shorter time.

3. The jellified foods prepared by the process of this invention will not remelt, but do retain their shape, even when heated to 70° to 120°C, thus lending themselves to such applications as in canned foods or bottled foods where the jellified foods of a certain shape are packed together with other materials and subjected to pasteurization, (about 120°C). As the melting points of agar-agar, and gelatin are about 80°C and 25°C, respectively, it is difficult to subject them to the routine pasteurization.

Thus, the method of the present invention has various merits and offers novel and excellent jellified foods which other conventional processes do not provide. The invention is particularly suited to instant jelly products of the premix type which can be used at home for the preparation of tasty jellified foods, as well as to commercial applications and therefore the jellified foods according to this invention can largely replace the conventional gellies containing agar-agar and gelatin. The jellified food by the present invention is not only excellent in quality, particularly in such properties as texture, mouldability and shape retention at a wide pH range, but has the advantage that, under suitably controlled temperature conditions, it can assume many forms such as cold jellies, warm jellies and frozen jellies. For example, the frozen version of a fruit jelly according to the instant invention gives a good texture or mouth-feel, and when thawed still maintains its form and enables one to repeat the freeze-thaw cycle to manufacture a large quantity of jelly and safely freeze it for storage. Moreover, this invention has various excellent features, one of which is the applicability of 'Polysaccharide' to the production of a variety of instant jelly-type foods such as yoghurt, bean curd, etc. Thus, the usefulness of this invention in food industries is great.

The following Experiments and Examples are further illustrative of this invention and its merits.

prepared was taken out and tested for gel strength, mouth-feel, etc. Measurement of gel strength was performed by means of a curd tension meter under the following conditions: weight 400 g.; diameter of pressure-sensitive shaft 8.0 mm; carriage speed 1 inch/21 seconds.

2. Test results

The test results are given in Table 1. The excellence of the method of this invention is clearly demonstrated. Thus, the jellies obtained by the method of this invention have textures agreeable to the mouth, and the control samples heated to 100°C did not gel at all. It was also found that redispersion by a homogenizer and defoaming by the application of a vacuum could be omitted in the working of this invention.

Table 1

| Heated to (°C) | Stirring under heat | Redispersion and degassing of dispersion before heating | Gel strength ($\times 10^3$/dyne cm$^2$) | Gelling characteristic |
| --- | --- | --- | --- | --- |
| 70 | Stirred | Treated | 180 | A gel having a slightly gritty but soft, gelatin-like eatable texture |
| | | Not treated | 160 | do. |
| | Not stirred | Treated | 130 | A gel having a soft homogeneous and tenacious texture. |
| | | Not treated | — | The powder settles to give an unhomogeneous gel with water separating. |
| 100 | Stirred | Treated | 0 | No gel is formed |
| | | Not treated | 0 | do. |
| | Not stirred | Treated | 496 | A homogeneous gel is formed |
| | | Not treated | — | The powder settles to give a foamed unhomogeneous gel with water separating. |

EXPERIMENT 1

1. Testing method

To 2 g. of powdery polysaccharide B was added a sufficient amount of water (about 20°C) to make a total of 100 g. The mixture was stirred and the resultant dispersion was divided into aliquots which, in turn, were treated as follows. Thus, control aliquots were homogenized for 5 minutes and each of the resultant homogeneous dispersions was degassed by means of a vacuum pump (10 mm Hg.). This dispersion was then distributed into weighing bottles, 3 cm in diameter and 5 cm high, in amounts of 10 g. per bottle. To prepare samples according to this invention, the above stock dispersion was directly distributed into the same weighing bottles as above in amounts of 10 g. per bottle, bypassing the homogenization and degassing procedures. Then, some of these dispersion samples were heated under gentle stirring, i.e., manual stirring with the aid of a sparter, while the other samples were heated without agitation. All the samples were heated at 70°C or 100°C in the routine manner.

Then, each weighing bottle was dipped in cold water and kept stationary there for 10 minutes. Thereafter, the cooled bottle was kept stationary at room temperature (about 20°C) for 30 minutes. The gel sample thus

EXPERIMENT 2

1. Test procedure

Aliquots (200 ml each) of aqueous dispersions containing 1 % and 2 %, respectively, by weight of powdery polysaccharide B (about 20°C) were respectively put in aluminum skillets of 1,000 ml capacity. Each of the dispersion samples was warmed over a medium flame of a gas cooking burner while it was stirred with a large spoon at the rate of 30 turns per minute to prepare the samples having the temperatures set forth in the following table. When each of the samples had reached the predetermined temperature, it was taken away from the burner and promptly dispensed into 3 pudding cups (capacity 90 ml) in amounts of about 60 g. each.

Thereafter, the samples were held stationary in cold water for 10 minutes and then in a refrigerator at 5°C for 30 minutes. The samples are then taken out to room temperature conditions and tested by a curd meter in the same manner as Experiment 1.

2. Test results

Table 2 shows that irrespective of the concentrations of polysaccharide B tested, satisfactory gels were obtained when the final temperatures were 55° to 80°C. Temperatures below 55°C resulted in insufficient heating, while temperatures exceeding 80°C caused overheating.

Table 2

| Heated to (°C) | Heating time required (min.) | Gel strength (×10³ dyne/cm²) | | Gelation characteristics | Evaluation |
|---|---|---|---|---|---|
| | | 1 % dispersion | 2 % dispersion | | |
| 50 | 1.5 | 0 | 0 | No gel is obtained | − |
| 55 | 1.6 | 33.5 | 234.7 | A homogeneous, soft gel is obtained; satisfactory | + |
| 60 | 1.7 | 77.5 | 209.1 | A homogeneous, firm gel is obtained; satisfactory | ++ |
| 65 | 1.9 | 66.0 | 214.9 | do. | ++ |
| 70 | 2.0 | 37.3 | 163.7 | A slightly gritty but firm gel is produced; satisfactory | ++ |
| 80 | 2.3 | 23.5 | 80.0 | A gritty, slightly fragile gel is produced; satisfactory | + |
| 85 | 2.5 | 5.5 | 38.0 | A gritty, very weak gel is produced; unsatisfactory | ± |
| 90 | 3.0 | 0 | 0 | No gel is obtained | − |

EXPERIMENT 3

1. Test procedure

There was prepared an aqueous dispersion (20°C) containing polysaccharide B (powder) in a varying concentration as indicated in Table 3. Each of the dispersions was heated to 65°C under stirring and the resulting fluid was allowed to stand in a refrigerator at 5°C to cool. The samples were then inspected for their gelatin characteristics.

2. Test results

As will be seen from Table 3, the polysaccharide could be used successfully in concentrations ranging from 0.5 to 5 weight %. In particular, gels having eatable textures were obtainable within the concentration range of 1 to 2 weight %. In this connection, tests were also performed in which 20 weight % of sucrose or 2 weight % of sodium chloride was used in conjunction, but the resultant gels had textures almost identical with those of the corresponding gels obtained in the above experiment.

Table 3

| Concentration of polysaccharide B (weight %) | Gel strength (×10³ dynes/cm²) | Gelation characteristic |
|---|---|---|
| 0.3 | 0 | No gel is produced. Unsatisfactory. |
| 0.5 | 12 | A very soft gel is obtained. |
| 1.0 | 80 | A gel having a soft, eatable texture is produced. |
| 2.0 | 264 | A gel having a firm, eatable texture is produced. |
| 3.0 | 368 | A gel having a firm and somewhat fragile texture is produced |
| 5.0 | 384 | do. (Heating tends to cause increases in viscosity and an inclusion of bubbles.) |
| 7.0 | — | In heating, the high viscosity of the system prevents formation of a homogeneous gel. Unsatisfactory. |

EXPERIMENT 4

1. Test procedure

In a manner similar to that described in Experiment 2, 200 ml each of an aqueous dispersion of polysaccharide B (2 to 5 %) was heated to 65°C with stirring and then allowed to stand at 5°C for one hour. The resultant gels were cut into 1.5 cm³ cubes and canned together with an equal volume of water. The whole was heated at a temperature indicated in Table 4.

By way of comparison, tests were made on the samples containing agar-agar or gelatin in place of polysaccharide B.

2. Test results.

As will be seen from Table 4, the gels prepared by the present method remained unchanged in shape upon reheating, whereas the gels made from agar-agar or gelatin were disintegrated when heated at a temperature beyond 80°C (in case of agar-agar) or 60°C (in case of gelatin).

Table 4

| Reheating temperature (°C) | PS-B 2–5 % | Agar-agar 2–5 % | Gelatin 2–5 % |
|---|---|---|---|
| 60 | + | + | − |
| 70 | + | + | − |
| 80 | + | − | − |
| 100 | + | − | − |
| 120 | + | − | − |

+ remain unchanged in shape.
− disintegrated.

EXAMPLE 1

To a homogeneous powdery mixture of 70 g. of sucrose, 20 g. of glucose, 1.5 g. of citric acid, 9.5 g. of fruit flavor, 0.01 g. of artificial color and 4 g. of powdery polysaccharide B, there is added 100 ml of water which is at about 30°C. After the mixture is stirred well, 300 ml of boiling water is added, followed by stirring, whereupon a homogeneous fluid of about 70°C is obtained. The fluid is distributed into 8 jelly cups and allowed to stand and cool in a refrigerator at 5°C for about 30 minutes. The procedure causes the solution to gel and gives a cold fruit jelly. This jelly can be easily released from the molding cup and has an eatable mouth-feel similar to that of gelatin or agar jelly. However, this jelly has the desirable characteristic that its flavor tends to spread in the mouth and is tasty and highly palatable.

EXAMPLE 2

Fifty (50) g. of powdery polysaccharide A is added to 950 g. of honey and the mixture is stirred well to obtain a dispersion. A 20 g. portion of this dispersion is put in a cup (capacity: 150 ml) and, with the addition of 80 ml of hot water (100°C), is stirred. The procedure gives a fluid of about 65°C. The cup is placed in a freezer at −10°C, where it is allowed to stand for about 15 minutes, whereupon a tasty and palatable honey jelly is obtained. This jelly can also be released easily from the moulding cup.

EXAMPLE 3

To a homogeneous powdery mixture of 30 g. of sucrose, 2 g. of powdered coffee and 2 g. of powdery curdlan, there is added 180 ml of milk of about 20°C. The suspension is put in a skillet and heated over a medium flame. Under stirring, the suspension is heated to 60°C and the resultant fluid is taken away from the flame. It is then distributed into 3 pudding cups.

The cups are placed in a refrigerator at 5°C and kept stationary there for about 30 minutes. When thus cooled, the fluid in each cup sets to give a cold tasty pudding having a highly palatable texture. This pudding releases itself quite readily from the moulding cup. The pudding is somewhat softer than those made from egg and gelatin but gives a smooth mouth-feel and tastes good.

EXAMPLE 4

To 35 g. of bean protein powder is added 300 ml of water, followed by boiling for 3 minutes. Meanwhile, 15 g. of the same bean protein powder as above and 14 g. of powdery polysaccharide B are thoroughly blended and then dispersed by the addition of 200 ml of water. The above two fluids are poured together into a moulding tray and the combined fluids are stirred. The tray is held stationary and the contents are allowed to cool in situ. The resultant product is taken out from the tray and washed with running water for 10 minutes, whereupon a tasty bean curd is obtained. This bean curd has an even texture and provides a good mouth-feel.

EXAMPLE 5

To a mixture of 30 g. of reconstituted milk and 3 g. of powdery polysaccharide B is added 50 ml of water and after stirring and admixing to homogeneity, 30 g. of steamed rice paste is added. The mixture is further stirred and admixed. Then, with the addition of 150 ml of boiling water, the mixture is stirred, whereupon a fluid of about 60°C is obtained.

This fluid is allowed to stand and cool at room temperature for about 10 minutes. The procedure gives a warm rice pudding, which has a texture comparable to that of soft varieties of puddings and is suited for use as a weaning food.

The use of polysaccharide A in the above procedure also yielded tasty puddings similar to those obtained above.

EXAMPLE 6

To a homogeneous mixture of 50 g. of sucrose, 2 g. of cocoa powder and 3 g. of polysaccharide B is added 50 ml of milk which is at a temperature of about 20°C. After stirring well 150 ml of boiling milk is further added and the mixture is stirred, whereupon a fluid of about 65°C is obtained. This fluid is distributed into 3 pudding cups and allowed to stand and cool at room temperature (about 20°C) for 1 hour and then is kept stationary in a freezer at −10°C overnight. The resultant frozen puddings can be served as such, or when thawed by allowing to stand in the room (about 20°C) for about 30 minutes, giving tasty chocolate puddings. Thus, even after freezing and thawing, the puddings show an excellent elasticity. In this connection, the use of polysaccharide A or curdlan in the above procedure also gives tasty chocolate puddings similar to the puddings obtained above.

EXAMPLE 7

To a mixture of 20 g. of sucrose, 20 g. of bean paste and 4 g. of powdery polysaccharide B is added 160 ml of water which is at a temperature of about 20°C. After stirring well, the mixture is heated in a skillet over a medium flame. When the temperature of the fluid has reached about 65°C, and the fluid begins to become viscous, the fluid is poured in a moulding tray (capacity 300 ml). The tray is then placed in a refrigerator at about 5°C and kept stationary there for about 30 minutes, whereby the fluid is caused to set and give a tasty jelly.

EXAMPLE 8

To 30 g. of powdery polysaccharide B is added 500 ml of water of 20°C. After stirring to disperse, 1,500 ml of hot water (90°C) is added and the mixture is stirred to prepare a polysaccharide fluid. This fluid is poured in a flat-bottomed moulding box to a thickness of 1.5 cm and allowed to cool in situ in the room which is maintained at a temperature of about 20°C. The fluid sets in about 30 minutes to give a gel of adequate consistency. The gel is cut into cubes, 1.5 cm$^3$ each, to prepare about 2 kg. of jelly cubes similar to agar cubes. Then, a 100 g. portion of the agar-like jelly of polysaccharide B, 30 g. of red peas, 20 g. of yellow peach, 1 cherry, and 150 g. of sucrose syrup (30 % concentration) are placed into a synthetic resin bag. After the bag is sealed, it is pasteurized at 85°C for 30 minutes. Samples of the packaged product obtained by the above procedure are inspected for appearance and eatability immediately after manufacture and after one month of storage. The results indicate that all the samples are tasty, and that especially the jelly cubes retain their shapes, are attractive in appearance, and have a texture similar to that of agar jellies and a pleasing taste.

What we claim is:

1. A method for preparing a jellified food which comprises heating an aqueous dispersion containing a thermally gelable polysaccharide consisting mainly of β-1, 3-glucose units produced by a microorganism selected from the group consisting of *Alkaligenes faecalis* var. *mixogenes* and *Agrobacterium radiobacter* as the gelling agent to 55°C to 80°C under stirring to prepare a fluid containing from 0.5 to 5 weight percent of said polysaccharide, and leaving the fluid to stand and cool to a temperature not higher than 40°C.

2. A jellified food prepared by heating an aqueous dispersion containing a thermally gelable polysaccharide consisting mainly of β-1, 3-glucose units produced by a microorganism selected from the group consisting of *Alkaligenes faecalis* var *mixogenes* and *Agrobacterium radiobacter* as gelling agent to 55°C to 80°C under stirring to prepare a fluid containing from 0.5 to 5 weight percent of said polysaccharide, and leaving the fluid to stand and cool to a temperature not higher than 40°C.

3. The jellified food according to claim 2, which contains industrially acceptable food condiments and food additives.

4. The method according to claim 1, wherein the thermally gelable polysaccharide is that produced by *Alkaligenes faecalis* var. *mixogenes*.

5. The jellified food according to claim 2, wherein the thermally gellable polysaccharide is that produced by *Agrobacterium radiobacter*.

* * * * *